United States Patent
Grant et al.

(10) Patent No.: US 9,692,842 B2
(45) Date of Patent: Jun. 27, 2017

(54) AUTOMATICALLY GENERATING WEB CONFERENCE RECORDING BOOKMARKS BASED ON USER ANALYTICS

(71) Applicant: International Business Machines Corporation, Armonk, NY (US)

(72) Inventors: Cristina L. Grant, Coral Gables, FL (US); Patricia Leon, Miami, FL (US); Adriana Valido, Pompano Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

(21) Appl. No.: 14/662,820

(22) Filed: Mar. 19, 2015

(65) Prior Publication Data
US 2016/0277518 A1  Sep. 22, 2016

(51) Int. Cl.
*H04L 29/08* (2006.01)
*G06N 7/00* (2006.01)
*G06Q 10/00* (2012.01)

(52) U.S. Cl.
CPC ............ *H04L 67/22* (2013.01); *G06N 7/005* (2013.01); *G06Q 10/00* (2013.01)

(58) Field of Classification Search
CPC . G06N 5/00–5/048; G06N 7/00–7/026; G06Q 10/00; H04L 67/00–67/22; H04L 65/40–65/403; G06F 11/30–11/34
See application file for complete search history.

(56) References Cited

U.S. PATENT DOCUMENTS 7,466,334 B1  12/2008  Baba
7,672,864 B2   3/2010  Nair et al.
(Continued)

FOREIGN PATENT DOCUMENTS

WO  2011038012 A2  3/2011

OTHER PUBLICATIONS

"Add or Remove a Bookmark for Audio and Video Clips," [online] Office, Microsfot Coproration © 2015 [retrieved Mar. 19, 2015] retrieved from the Internet: <https://support.office.com/en-us/article/Add-or-remove-a-bookmark-for-audio-and-video-clips-eafb434f-5038-4c6a-93d0-428a9b68b7fa?CorrelationId=7833857a-2480-4846-b732-a83e854ae65a&ui=en-US&rs=en-US&ad=US>, 2 pg.
Cutts, M. "Link to a Specific Part of a YouTube Video," [online] Matt Cutts: gadgets, Google, and SEO, Mar. 4, 2009 [retrieved Mar. 19, 2015] retrieved from the Internet: <https://www.mattcutts.com/blog/link-to-youtube-minute-second/>, 9 pg.
(Continued)

*Primary Examiner* — Nicholas Taylor
*Assistant Examiner* — Clayton R Williams
(74) *Attorney, Agent, or Firm* — Cuenot, Forsythe & Kim, LLC

(57) ABSTRACT

Arrangements described herein include accessing user data associated with a user participating in a web conference. The user data includes user analytics generated by tracking and analyzing use, by the user, of web based resources unrelated to the web conference. A plurality of topics discussed during the web conference can be identified in real time. For each respective topic that has a high probability of being of interest to the user, at least one bookmark for the web conference can be generated. Data contained in the bookmark artifact can be applied to a recording of the web conference to bookmark in the recording of the web conference each respective topic that has a high probability of being of interest to the user. An association between the recording of the web conference and the user can be created.

20 Claims, 3 Drawing Sheets

(56) References Cited

U.S. PATENT DOCUMENTS

| | | |
|---|---|---|
| 8,380,487 B2 | 2/2013 | Bastide et al. |
| 8,774,596 B2 | 7/2014 | Kurupacheril et al. |
| 2004/0223737 A1 | 11/2004 | Johnson |
| 2008/0148160 A1 | 6/2008 | Holmes et al. |
| 2009/0193327 A1 | 7/2009 | Roychoudhuri et al. |
| 2009/0225971 A1* | 9/2009 | Miller ............... H04M 3/42153 379/202.01 |
| 2011/0060591 A1 | 3/2011 | Chanvez et al. |
| 2012/0224021 A1* | 9/2012 | Begeja ................. H04N 7/147 348/14.08 |
| 2013/0239024 A1* | 9/2013 | Lewis ................... H04N 7/147 715/756 |
| 2013/0325972 A1* | 12/2013 | Boston ............... G06K 9/00751 709/206 |
| 2014/0161417 A1 | 6/2014 | Kurupacheril et al. |
| 2014/0164501 A1* | 6/2014 | Herger .................... H04N 7/15 709/204 |
| 2014/0325335 A1* | 10/2014 | Paulik ................. G06F 17/2241 715/234 |
| 2014/0379729 A1* | 12/2014 | Savage .................. H04L 51/26 707/748 |

OTHER PUBLICATIONS

"Method and System for Capturing Content from a Shared Screen in a Web Conference," IP.com Prior Art Database Technical Disclosure, No. 000215516, Mar. 6, 2012, 3 pg.

* cited by examiner

400

Responsive to a user joining a web conference, access user data associated with the user, the user data comprising user analytics generated by tracking and analyzing use, by the user, of web based resources unrelated to the web conference
402

Identify, in real time while multimedia content is presented during the web conference, a plurality of topics discussed during the web conference
404

Responsive to identifying each respective topic, determine whether the respective topic has a high probability of being of interest to the user by determining whether there is a correlation between information presented for the respective topic during the web conference and the user data associated with the user
406

For each respective topic that has a high probability of being of interest to the user, responsive to determining that the respective topic has a high probability of being of interest to the user, generate, using a processor, at least one bookmark for the web conference, the bookmark configured to provide, upon selection of the bookmark by the user, access to a segment of the web conference containing the respective topic
408

Add the at least one bookmark to a bookmark artifact associated with the user
410

Responsive to detecting an end of the web conference, apply data contained in the bookmark artifact to a recording of the web conference to bookmark in the recording of the web conference each respective topic that has a high probability of being of interest to the user
412

Create an association between the recording of the web conference and the user, wherein the recording of the web conference is configured to be accessed by the user based on the association between the recording of the web conference and the user that is created
414

FIG. 4

AUTOMATICALLY GENERATING WEB CONFERENCE RECORDING BOOKMARKS BASED ON USER ANALYTICS

BACKGROUND

Arrangements described herein relate to web conferencing.

The use of web conferencing has grown significantly over the last decade, facilitated by the proliferation of communication networks, such as the Internet and mobile communication networks, and increases in available bandwidth. These services are valuable tools in the present communication age. Web conferencing is a service that allows conferencing events to be shared with remote locations. In general, the service is made possible by Internet technologies, particularly on TCP/IP connections. Web conferencing allows real-time point-to-point communications as well as multicast communications from one sender to many receivers during a Web conference.

SUMMARY

A method includes, responsive to a user joining a web conference, accessing user data associated with the user, the user data including user analytics generated by tracking and analyzing use, by the user, of web based resources unrelated to the web conference. The method also includes identifying, in real time while multimedia content is presented during the web conference, a plurality of topics discussed during the web conference. The method also includes, responsive to identifying each respective topic, determining whether the respective topic has a high probability of being of interest to the user by determining whether there is a correlation between information presented for the respective topic during the web conference and the user data associated with the user. The method also includes, for each respective topic that has a high probability of being of interest to the user, responsive to determining that the respective topic has a high probability of being of interest to the user, generating, using a processor, at least one bookmark for the web conference, the bookmark configured to provide, upon selection of the bookmark by the user, access to a segment of the web conference containing the respective topic. The at least one bookmark can be added to a bookmark artifact associated with the user. The method also includes, responsive to detecting an end of the web conference, applying data contained in the bookmark artifact to a recording of the web conference to bookmark in the recording of the web conference each respective topic that has a high probability of being of interest to the user. The method also includes creating an association between the recording of the web conference and the user, wherein the recording of the web conference is configured to be accessed by the user based on the association between the recording of the web conference and the user that is created.

A system includes a processor programmed to initiate executable operations. The executable operations include, responsive to a user joining a web conference, accessing user data associated with the user, the user data including user analytics generated by tracking and analyzing use, by the user, of web based resources unrelated to the web conference. The executable operations also include identifying, in real time while multimedia content is presented during the web conference, a plurality of topics discussed during the web conference. The executable operations also include, responsive to identifying each respective topic, determining whether the respective topic has a high probability of being of interest to the user by determining whether there is a correlation between information presented for the respective topic during the web conference and the user data associated with the user. The executable operations also include, for each respective topic that has a high probability of being of interest to the user, responsive to determining that the respective topic has a high probability of being of interest to the user, generating at least one bookmark for the web conference, the bookmark configured to provide, upon selection of the bookmark by the user, access to a segment of the web conference containing the respective topic. The at least one bookmark can be added to a bookmark artifact associated with the user. The executable operations also include, responsive to detecting an end of the web conference, applying data contained in the bookmark artifact to a recording of the web conference to bookmark in the recording of the web conference each respective topic that has a high probability of being of interest to the user. The executable operations also include creating an association between the recording of the web conference and the user, wherein the recording of the web conference is configured to be accessed by the user based on the association between the recording of the web conference and the user that is created.

A computer program includes a computer readable storage medium having program code stored thereon. The program code is executable by a processor to perform a method. The method includes, responsive to a user joining a web conference, accessing, by the processor, user data associated with the user, the user data including user analytics generated by tracking and analyzing use, by the user, of web based resources unrelated to the web conference. The method also includes identifying, by the processor, in real time while multimedia content is presented during the web conference, a plurality of topics discussed during the web conference. The method also includes, responsive to identifying each respective topic, determining, by the processor, whether the respective topic has a high probability of being of interest to the user by determining whether there is a correlation between information presented for the respective topic during the web conference and the user data associated with the user. The method also includes, for each respective topic that has a high probability of being of interest to the user, responsive to determining that the respective topic has a high probability of being of interest to the user, generating, by the processor, at least one bookmark for the web conference, the bookmark configured to provide, upon selection of the bookmark by the user, access to a segment of the web conference containing the respective topic. The at least one bookmark can be added to a bookmark artifact associated with the user. The method also includes, responsive to detecting an end of the web conference, applying, by the processor, data contained in the bookmark artifact to a recording of the web conference to bookmark in the recording of the web conference each respective topic that has a high probability of being of interest to the user. The method also includes creating, by the processor, an association between the recording of the web conference and the user, wherein the recording of the web conference is configured to be accessed by the user based on the association between the recording of the web conference and the user that is created.

BRIEF DESCRIPTION OF THE DRAWINGS

FIG. 4 is a flow chart illustrating an example of a method of automatically generating web conference recording bookmarks.

DETAILED DESCRIPTION

Figure 1:
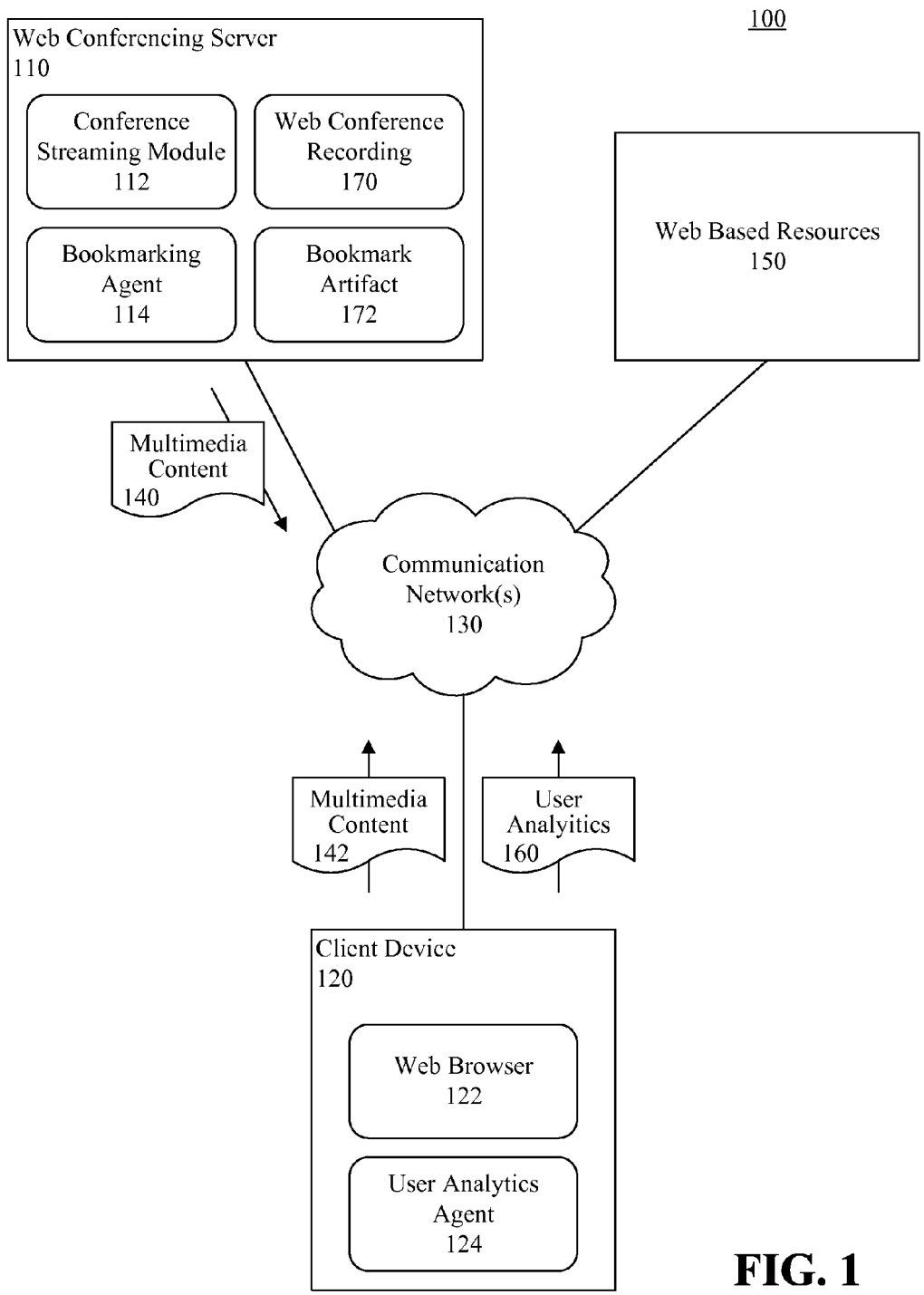
FIG. 1 is a block diagram illustrating example architecture for a system in which web conference recording bookmarks are automatically generated.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to bookmarking a recording of a web conference. Responsive to a web conference being presented to a user, user data associated with the user can be accessed. The user data can include user analytics generated by tracking and analyzing use, by the user, of web based resources unrelated to the web conference, as well as user bookmarking preferences selected and/or generated by the user. A plurality of topics discussed during the web conference can be identified in real time while multimedia content is presented during the web conference. Responsive to identifying each respective topic, a determination can be made, for each respective topic, whether the respective topic has a high probability of being of interest to the user. For each respective topic that has a high probability of being of interest to the user, one or more bookmarks for the web conference can be created and applied to a recorded version of the web conference. An association between the recording of the web conference and the user can be created, and the recording of the web conference can be configured to be accessed by the user based on the association. When accessing the recording of the web conference, the user can select the created bookmarks to access segments of the web conference corresponding to the bookmarks. Thus, when the recording of the web conference is presented to the user, the user can quickly select segments of the web conference that have a high probability of being of interest to the user.

Several definitions that apply throughout this document now will be presented.

As defined herein, the term "web conference" means a conferencing event shared, in real time, with a plurality of users over one or more communication networks. Multimedia content generated during a web conference is shared with the plurality of users in real time as the multimedia content is generated. During a web conference, two or more of the users may interact with one another via their respective communication devices.

As defined herein, the term "multimedia content" means content including audio, video, images and/or text that is configured to be communicated electronically via one or more communication networks.

As defined herein, the term "user analytics" means data relating to a user generated by a systematic computational analysis of other data and/or statistics related that user.

As defined herein, the term "web based resources unrelated to the web conference" means resources accessed by a user, via one or more networks, wherein the resources are independent of, and not directly linked to, web conferencing software executed to host the web conference. Examples of "web based resources unrelated to the web conference" include, but are not limited to, websites, social networking systems, blog hosting systems, text messaging systems, e-mail systems, search engines, and the like. In the context of the arrangements described herein, a text message sent from a user to another user within a web conference, and presented to the other user by the web conferencing software, is not a web based resource unrelated to the web conference.

As defined herein, the term "topic" means the subject of a discourse.

As defined herein, the term "high probability of being of interest to the user" means a conclusion, supported by evidence, that something will be of interest to the user.

As defined herein, the term "bookmark" means at least one identifier that identifies a segment of a web conference and enables, upon selection of the bookmark, access to that segment of the web conference in a recorded version of the web conference.

As defined herein, the term "bookmarking" means to generate at least one bookmark.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or the like.

As defined herein, the term "automatically" means without user intervention.

As defined herein, the term "user" means a person (i.e., a human being).

FIG. 1 is a block diagram illustrating example architecture for a system 100 in which web conference recording bookmarks are automatically generated. The system 100 can include a web conferencing server 110, which can comprise a conference streaming module 112 and a bookmarking agent 114.

Figure 2:
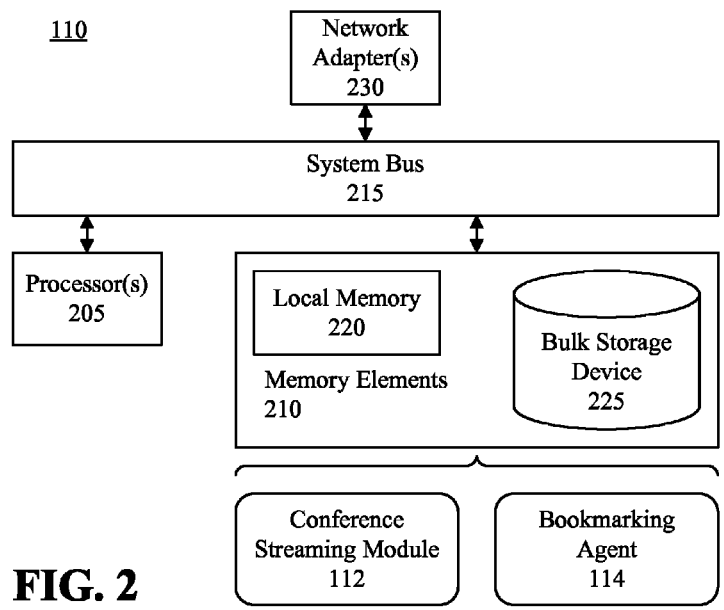
FIG. 2 is a block diagram illustrating example architecture for a web conferencing server.

FIG. 2 is a block diagram illustrating example architecture for the web conferencing server 110. The web conferencing server 110 can include one or more processors 205 (e.g., a central processing unit) coupled to memory elements 210 through a system bus 215 or other suitable circuitry. As such, the web conferencing server 110 can store program code within the memory elements 210. The processor(s) 205 can execute the program code accessed from the memory elements 210 via the system bus 215. It should be appreciated that the web conferencing server 110 can be implemented in the form of any system including at least one processor and memory that is capable of performing the functions and/or operations described within this specification for the web conferencing server 110. For example, the web conferencing server 110 can be implemented as a computer. In one arrangement, the web conferencing server 110 can be implemented as a plurality of computers and/or other systems that are communicatively linked, and different operations performed by the web conferencing server 110 can be allocated to different systems.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The web conferencing server 110 also can include one or more cache memories (not shown) that provide temporary storage of at least some program code in order to reduce the number of times program code must be retrieved from the bulk storage device 225 during execution.

Input/output (I/O) devices such as one or more network adapters 230 can be coupled to the web conferencing server 110 either directly or through intervening I/O controllers. The network adapter(s) 230 can be configured to enable the web conferencing server 110 to become coupled to other systems, computer systems, remote printers, and/or remote storage devices through intervening private or public networks. Modems, cable modems, transceivers, and Ethernet cards are examples of different types of network adapters 230 that can be used with the web conferencing server 110.

As pictured in FIG. 2, the memory elements 210 can store the components of the web conferencing server 110, namely the conference streaming module 112 and the bookmarking agent 114. The memory elements 210 also can store an operating system (not shown) and other software used to provide a computing environment for hosting the conference streaming module 112 and the bookmarking agent 114. Being implemented in the form of executable program code, these components of the web conferencing server 110 can be executed by the web conferencing server 110 and, as such, can be considered part of the web conferencing server 110. Moreover, the conference streaming module 112 and the bookmarking agent 114 are functional data structures that impart functionality when employed as part of the web conferencing server 110.

Data generated by the bookmarking agent 114 can be output to, and stored within, the memory elements 210. For example, when executing the bookmarking agent 114, the processor 205 can write data to a file stored in memory elements 210. Further, the bookmarking agent 114 can send or transmit data to another system, export data, or the like.

Referring again to FIG. 1, the system 100 also can include one or more client devices, such as a client device 120. The client device 120 can comprise a web browser 122 and a user analytics agent 124. The user analytics agent 124 can be implemented as a plugin for the web browser 122, or as a standalone application or service executing on the client device 120.

Figure 3:
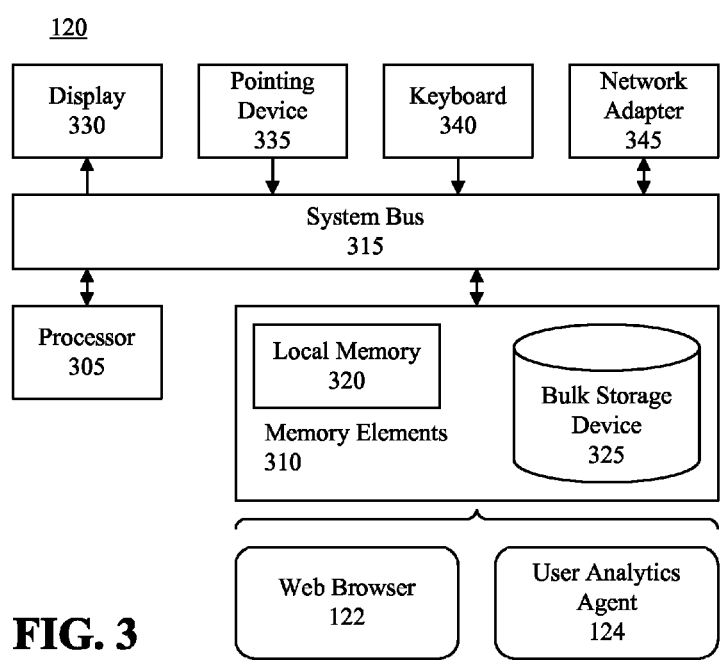
FIG. 3 is a block diagram illustrating example architecture for a client device.

FIG. 3 is a block diagram illustrating example architecture for the client device 120. The client device 120 can include at least one processor 305 (e.g., a central processing unit) coupled to memory elements 310 through a system bus 315 or other suitable circuitry. As such, the client device 120 can store program code within the memory elements 310. The processor 305 can execute the program code accessed from the memory elements 310 via the system bus 315. It should be appreciated that the client device 120 can be implemented in the form of any system including a processor and memory that is capable of performing the functions and/or operations described within this specification for the client device 120. For example, the client device 120 can be implemented as a computer, a workstation, a mobile computer, a laptop computer, a tablet computer, a smart phone, a personal digital assistant, a gaming device, a network appliance, and so on.

The memory elements 310 can include one or more physical memory devices such as, for example, local memory 320, one or more bulk storage devices 325 and one or more cache memories (not shown). Input/output (I/O) devices such as a display 330, a pointing device 335 and, optionally, a keyboard 340 can be coupled to the client device 120. The I/O devices can be coupled to the client device 120 either directly or through intervening I/O controllers. For example, the display 330 can be coupled to the client device 120 via a graphics processing unit (GPU), which may be a component of the processor 305 or a discrete device. One or more network adapters 345 also can be coupled to client device 120 to enable the client device 120 to become coupled to other systems, computer systems, remote printers, and/or remote storage devices through intervening private or public networks. Modems, cable modems, transceivers, and Ethernet cards are examples of different types of network adapters 345 that can be used with the client device 120.

As pictured in FIG. 3, the memory elements 310 can store the components of the client device 120, namely the web browser 122 and the user analytics agent 124. The memory elements 310 also can store an operating system (not shown) and other software used to provide a computing environment for hosting the web browser 122 and the user analytics agent 124. Being implemented in the form of executable program code, these components of the client device 120 can be executed by the client device 120 and, as such, can be considered part of the client device 120. Moreover, the web browser 122 and the user analytics agent 124 are functional data structures that impart functionality when employed as part of the client device 120.

Data generated by the user analytics agent 124 can be output to, and stored within, the memory elements 310. For example, when executing the user analytics agent 124, the processor 305 can write data to a file stored in memory elements 310. Further, the user analytics agent 124 can send or transmit data to another system, export data, or the like.

Referring again to FIG. 1, the client device 120 can be communicatively linked to the web conferencing server 110 via one or more communication networks 130. The communication network(s) 130 is/are the medium used to provide communications links between various devices and data processing systems connected together within the system 100. The communication network(s) 130 may include connections, such as wire, wireless communication links, or fiber optic cables. The communication network(s) 130 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), and/or the like.

Via the communication network(s) 130, a user of the client device 120 can participate in a web conference hosted by the web conferencing server 110. In illustration, the web conferencing server 110 can stream to the client device 120 multimedia content 140 generated and/or presented during the web conference. The multimedia content 140 can be streamed to the user, in real time, while the multimedia content 140 is generated and/or presented. In other words, the web conference can be presented live to the user as the web conference takes place. During the web conference, participants, such as the user of the client device 120, can interact with other participants. When the user of the client device 120 interacts with the other participants, the client device 120 can stream to the web conferencing server 110 multimedia content 142 generated and/or presented by the user. For example, the client device can include a camera and a microphone to capture video and/or audio content, and stream such multimedia content 142 to the web conferencing server 110. In response, the web conferencing server 110 can stream the multimedia content 142 to the client devices of other participants.

Via the communication network(s) 130, the user of the client device 120 also can access and use one or more web based resources 150. Examples of such web based resources 150 include, but are not limited to, websites, social networking systems, blog hosting systems, text messaging systems, e-mail systems, search engines, and the like. The web based resources 150 can be unrelated to a web conference hosted by the web conferencing server 110. In illustration, the user can access a social networking system (e.g., Facebook®, Linkedin®, etc.) which does not maintain the web conferencing server 110 nor host web conferences via the web conferencing server 110. The user also can access blogs not hosted by the web conferencing systems, send and receive text messages that are not routed through the web conferencing server 110, send and receive e-mails that are not routed through the web conferencing server 110, etc. The user can access the web based resources using the web browser 122 and/or other applications configured to exchange data with the web based resources. Examples of such other applications include, but are not limited to, e-mail clients, text messaging clients, mobile applications, and the like.

The user analytics agent 124 can track the user's access and use of web based resources 150. For example, the user analytics agent 124 can monitor which web based resources 150 the user accesses using the client device 120, Internet searches initiated by the user (e.g., using an Internet search engine), data retrieved by the user from the web based resources 150, data provided by the user to the web based resources, etc. In illustration, the user analytics agent 124 can track blogs and social network posts accessed by the user and information posted by the user to blogs and social networking systems. The user analytics agent 124 also can track e-mails and text messages accessed by and/or generated by the user. The user analytics agent 124 also can track Internet searches initiated by the user, websites/hyperlinks selected by the user in response to the initiated searches, and information presented to the user in response to such selections. The user analytics agent 124 can store the tracked data to a suitable data structure in the memory elements 310 of the client device 120, for example to a data table.

Further, the user analytics agent 124 can implement one or more algorithms to analyze the tracked data to generate user analytics. For instance, the user analytics agent 124 can identify topics the user reads or writes about using the web based resources 150. Such topics can be identified, for example, by keywords and/or phrases that appear in the tracked data. The keywords and/or phrases can be identified based on one or more algorithms which identify the frequency of their use and the context in which the keywords and/or phrases are used. For example, the user analytics agent 124 can implement semantic analysis, natural language processing (NLP) and data mining to identify the keywords and/or phrases. Semantic analysis, NLP and data mining are techniques for identifying keywords and phrases well known in the art. The user analytics agent 124 can store the user analytics to a suitable data structure in the memory elements 310 of the client device 120 and associate the user analytics with the user as user data.

In one arrangement, rather than being executed by the client device 120, the user analytics agent 124 can be installed on and/or executed by another processing system. For example, the user analytics agent 124 can be installed on and/or executed by a domain server that manages a domain with which the user/client device 120 is a member. Again, the user analytics agent 124 can monitor which web based resources 150 the user accesses using the client device 120, data retrieved by the user from the web based resources 150, data provided by the user to the web based resources, etc. Moreover, in this arrangement, the user analytics agent 124 also can monitor which web based resources 150 the user accesses using other client devices the user may use when logged into the domain. For example, the user may use different terminals within the domain, and may use a mobile device to connect to the domain. The user analytics agent 124 can monitor the user's access to the web based resources 150 using any such client devices. Accordingly, such an arrangement may provide a more complete set of data which can be analyzed to generate the user analytics.

The bookmarking agent 114 also can store user data. For instance, the bookmarking agent 114 can store bookmarking preferences selected and/or generated by the user as user data. In illustration, via the web browser 122 or another application, such as a web conferencing client application, the user can access the web conferencing server 110 and select and/or generate bookmarking preferences. The bookmarking agent 114 can store such user data to a suitable data structure, such as a data table, in the memory elements 210 of the web conferencing server 110. The bookmarking preferences can include, for example, settings that indicate whether the user desires a recording of the web conference to be made available to the user, whether the user desires the recording to be bookmarked, whether the bookmarking agent may access user analytics associated with the user, the types of bookmarks to be generated, features of the bookmarks, specific topics the user desires to have bookmarked, and so on.

In operation, via the client device 120, the user can log into the web conferencing server 110 over the communication network(s) 130 to join a web conference hosted by the web conferencing server 110. Responsive to the user joining the web conference, the bookmarking agent 114 can access the user data associated with the user. For example, the bookmarking agent 114 can send a request to the user analytics agent 124 to request the user analytics. In response, the user analytics agent 124 can communicate the requested user analytics 160 to the bookmarking agent 114 via the communication network(s) 130. Further, the bookmarking agent 114 can request other user data associated with the user. For example, the bookmarking agent can query the data structure in which the user's bookmarking preferences are stored to access the user's bookmarking preferences.

The conference streaming module 112 can be stream to the user, in real time, the web conference. Specifically, the web conference can be streamed as multimedia content 140. As noted, the client device 120 also may contribute multimedia content 142 to the web conference, for example when the user speaks or otherwise presents information during the web conference. While the multimedia content 140, 142 is presented during the web conference, the web conferencing server 110 can record the web conference as a web conference recording 170. The web conferencing server 110 can store the web conference recording 170 to a suitable data file stored in the memory elements 210.

Further, while the multimedia content 140, 142 is presented, the bookmarking agent 114 can identify, in real time, a plurality of topics discussed during the web conference. For example, the bookmarking agent 114 can implement semantic analysis, NLP and data mining to identify the topics. Responsive to identifying each respective topic, the bookmarking agent 114 can determine whether the respective topic has a high probability of being of interest to the user. For example, the bookmarking agent can determine whether there is a correlation between information presented for the respective topic during the web conference and the user data associated with the user. In illustration, if the user analytics 160 indicate that the user has participated in one or more discussions via blogs, e-mails, text messaging, social networks, etc. related to a particular topic, and/or the user has accessed web content pertaining to the particular topic, and that topic is discussed in the web conference, the bookmarking agent 114 can identify that topic has having a high probability of being of interest to the user.

Further, if the user bookmarking preferences indicate a specific topic for which the user has indicated a desire to have bookmarked, and the bookmarking agent 114 identifies a correlation between that specific topic and the topic identified in the web conference, the bookmarking agent can identify that topic as having a high probability of being of interest to the user. Also, the bookmarking agent 114 can monitor text messages exchanged by the user via the web conferencing server 110 during the web conference. The bookmarking agent 114 can apply semantic analysis, NLP and data mining to such text messages to identify keywords and/or phrases contained in such text messages. If the bookmarking agent 114 determines that a respective topic corresponds to the identified keywords and/or phrases, that topic can be identified as having a high probability of being of interest to the user. At this point it should be noted that the use of text messaging during the web conference via a text messaging service provided by the web conferencing server 110 is not considered to be use of a web based resource unrelated to the web conference.

For each respective topic determined to have a high probability of being of interest to the user, responsive to the determination being made, the bookmarking agent 114 can generate at least one bookmark for the web conference. Each bookmark can provide, upon selection of the bookmark by the user, access to a segment of the web conference containing the respective topic. In this regard, the bookmark can identify that particular segment of the web conference within the multimedia content 140, 142. The bookmark also can identify the specific topic, for example by identifying a keyword and/or phrase representing the topic. The bookmarking agent 114 can add the bookmark to a bookmark artifact 172 associated with the user. The web conferencing server 110 can create the bookmark artifact 172 responsive to the user joining the web conference, and store the bookmark artifact in the memory elements 210.

In addition to the bookmarks automatically generated for the user by the bookmarking agent 114 based on the user data, the user also can initiate bookmarking of one or more segments of the web conference within the multimedia content 140, 142. For example, if a particular segment is of particular interest to the user, while that segment is being presented, the user can select a button, menu item or other control in a view of the web conference presented on the display of the client device 120. Such user input can be received by the bookmarking agent 114. Responsive to receiving the user input, the bookmarking agent 114 can generate a corresponding bookmark. The bookmark can provide, upon selection of the bookmark, access to the corresponding segment of the web conference. That bookmark also can be added to the bookmark artifact 172 associated with the user.

In one arrangement, responsive to receiving the user input requesting the bookmark be created, the bookmarking agent 114 can present to the user, via the display of the client device, a field in which the user may enter keywords, phrases or notes pertaining to the particular segment of the multimedia content 140, 142 that is bookmarked.

Responsive to detecting an end of the web conference, the bookmarking agent 114 can apply data contained in the bookmark artifact 172 to the recording 170 of the web conference to bookmark in the recording 170 each respective topic that has a high probability of being of interest to the user, as well as segments bookmarked in response to user inputs. Further, the bookmarking agent 114 can create an association between the recording 170 of the web conference and the user. Specifically, the bookmarking agent 114 can configure the recording 170 of the web conference to be accessed by the user based on the association between the recording 170 of the web conference and the user that is created.

At any time after the recording of the web conference 170 has been configured to be accessed by the user, the user can access the recording 170. The recording 170 can include the bookmarks created for the user, and those bookmarks can be presented to the user. For example, the bookmarks can be presented as menu items in a web browser or multimedia playback application used to present the recording 170 to the user. Each bookmark can include a keyword, phrase or notes associated with the segment of the multimedia content 140, 142 represented by the bookmark. For example, for segments that were automatically identified by the bookmarking agent 114, the bookmarks can include the automatically identified keywords and/or phrases. For segments that were selected by the user, the bookmarks can include the keywords, phrases and/or notes provided by the user for such bookmarks. The bookmarks can be configured to be processed by a web browser or multimedia playback application to present the keywords, phrases and/or notes to the user with the bookmarks.

The user can select the bookmarks to jump to the segment in the recording 170 represented by that bookmark. Specifically, when the user selects a particular bookmark, the bookmark can be processed by the web browser or multimedia playback application to begin playback of the segment of the multimedia content 140, 142 corresponding to the bookmark, regardless of where in the recording 170 playback is currently located prior to the user selection of the bookmark.

FIG. 4 is a flow chart illustrating an example of a method 400 of automatically generating web conference recording bookmarks. At step 402, responsive to a user joining a web conference, user data associated with the user can be accessed. The user data can include user analytics generated by tracking and analyzing use, by the user, of web based resources unrelated to the web conference.

At step 404, a plurality of topics discussed during the web conference can be identified. The topics can be identified in real time while multimedia content is presented during the web conference.

At step 406, responsive to identifying each respective topic, a determination can be made as to whether the respective topic has a high probability of being of interest to the user. Such determination can be made by determining whether there is a correlation between information presented for the respective topic during the web conference and the user data associated with the user.

At step 408, for each respective topic that has a high probability of being of interest to the user, responsive to determining that the respective topic has a high probability of being of interest to the user, at least one bookmark for the web conference can be generated using a processor. The bookmark can be configured to provide, upon selection of the bookmark by the user, access to a segment of the web conference containing the respective topic.

At step 410, the bookmark can be added to a bookmark artifact associated with the user.

At step 412, responsive to detecting an end of the web conference, data contained in the bookmark artifact can be applied to a recording of the web conference to bookmark in the recording of the web conference each respective topic that has a high probability of being of interest to the user.

At step 414, an association between the recording of the web conference and the user can be created. The recording of the web conference can be configured to be accessed by the user based on the association between the recording of the web conference and the user that is created.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A method, comprising:
responsive to a user joining a web conference, accessing user data associated with the user, the user data comprising user analytics generated by tracking and analyzing use, by the user, of web based resources unrelated to the web conference;
identifying, in real time while multimedia content is presented during the web conference, a plurality of topics discussed during the web conference;
responsive to identifying each respective topic, determining whether the respective topic has a high probability of being of interest to the user by determining whether there is a correlation between information presented for the respective topic during the web conference and the user data associated with the user;
for each respective topic that has a high probability of being of interest to the user, responsive to determining that the respective topic has a high probability of being of interest to the user, generating, using a processor, at least one bookmark for the web conference, the bookmark configured to provide, upon selection of the bookmark by the user, access to a segment of the web conference containing the respective topic;
adding the at least one bookmark to a bookmark artifact associated with the user;
responsive to detecting an end of the web conference, applying data contained in the bookmark artifact to a recording of the web conference to bookmark in the recording of the web conference each respective topic that has a high probability of being of interest to the user; and
creating an association between the recording of the web conference and the user, wherein the recording of the web conference is configured to be accessed by the user based on the association between the recording of the web conference and the user that is created.

2. The method of claim 1, wherein the user analytics generated by tracking and analyzing use, by the user, of web based resources unrelated to the web conference are generated by tracking and analyzing use of a social networking system by the user.

3. The method of claim 1, wherein the user analytics generated by tracking and analyzing use, by the user, of web based resources unrelated to the web conference are generated by tracking and analyzing Internet searches performed by the user.

4. The method of claim 1, wherein the user data further comprises user bookmarking preferences selected or generated by the user.

5. The method of claim 1, further comprising:
receiving from the user at least one user input while the multimedia content is presented during the web conference;
responsive to the user input, generating at least a second bookmark providing, upon selection of the second bookmark, access to a second segment of the web conference; and
adding the second bookmark to the bookmark artifact associated with the user.

6. The method of claim 5, wherein the at least one user input comprises data entered by the user to be associated with the second bookmark, the method further comprising:
adding the data entered by the user to the bookmark artifact, wherein at least a portion of the data contained in the bookmark artifact is configured to be processed to present the data entered by the user back to the user responsive to the user selecting the second bookmark.

7. The method of claim 1, further comprising:
receiving the user analytics generated by tracking and analyzing use, by the user, of web based resources unrelated to the web conference from a user analytics agent executing on a client device used by the user.

8. A system, comprising:
a processor and a memory programmed to initiate executable operations comprising:
responsive to a user joining a web conference, accessing user data associated with the user, the user data comprising user analytics generated by tracking and analyzing use, by the user, of web based resources unrelated to the web conference;
identifying, in real time while multimedia content is presented during the web conference, a plurality of topics discussed during the web conference;
responsive to identifying each respective topic, determining whether the respective topic has a high probability of being of interest to the user by determining whether there is a correlation between information presented for the respective topic during the web conference and the user data associated with the user;
for each respective topic that has a high probability of being of interest to the user, responsive to determining that the respective topic has a high probability of being of interest to the user, generating at least one bookmark for the web conference, the bookmark configured to provide, upon selection of the bookmark by the user, access to a segment of the web conference containing the respective topic;
adding the at least one bookmark to a bookmark artifact associated with the user;
responsive to detecting an end of the web conference, applying data contained in the bookmark artifact to a recording of the web conference to bookmark in the recording of the web conference each respective topic that has a high probability of being of interest to the user; and
creating an association between the recording of the web conference and the user, wherein the recording of the web conference is configured to be accessed by the user based on the association between the recording of the web conference and the user that is created.

9. The system of claim 8, wherein the user analytics generated by tracking and analyzing use, by the user, of web based resources unrelated to the web conference are generated by tracking and analyzing use of a social networking system by the user.

10. The system of claim 8, wherein the user analytics generated by tracking and analyzing use, by the user, of web based resources unrelated to the web conference are generated by tracking and analyzing Internet searches performed by the user.

11. The system of claim 8, wherein the user data further comprises user bookmarking preferences selected or generated by the user.

12. The system of claim 8, the executable operations further comprising:
receiving from the user at least one user input while the multimedia content is presented during the web conference;
responsive to the user input, generating at least a second bookmark providing, upon selection of the second bookmark, access to a second segment of the web conference; and
adding the second bookmark to the bookmark artifact associated with the user.

13. The system of claim 8, wherein the at least one user input comprises data entered by the user to be associated with the second bookmark, the executable operations further comprising:
adding the data entered by the user to the bookmark artifact, wherein at least a portion of the data contained in the bookmark artifact is configured to be processed to present the data entered by the user back to the user responsive to the user selecting the second bookmark.

14. The system of claim 8, the executable operations further comprising:
receiving the user analytics generated by tracking and analyzing use, by the user, of web based resources unrelated to the web conference from a user analytics agent executing on a client device used by the user.

15. A computer program product comprising a computer readable storage medium having program code stored thereon, the program code executable by a processor to perform a method comprising:
responsive to a user joining a web conference, accessing, by the processor, user data associated with the user, the user data comprising user analytics generated by tracking and analyzing use, by the user, of web based resources unrelated to the web conference;
identifying, by the processor, in real time while multimedia content is presented during the web conference, a plurality of topics discussed during the web conference;
responsive to identifying each respective topic, determining, by the processor, whether the respective topic has a high probability of being of interest to the user by determining whether there is a correlation between information presented for the respective topic during the web conference and the user data associated with the user;
for each respective topic that has a high probability of being of interest to the user, responsive to determining that the respective topic has a high probability of being of interest to the user, generating, by the processor, at least one bookmark for the web conference, the bookmark configured to provide, upon selection of the bookmark by the user, access to a segment of the web conference containing the respective topic;

adding, by the processor, the at least one bookmark to a bookmark artifact associated with the user;

responsive to detecting an end of the web conference, applying, by the processor, data contained in the bookmark artifact to a recording of the web conference to bookmark in the recording of the web conference each respective topic that has a high probability of being of interest to the user; and creating, by the processor, an association between the recording of the web conference and the user, wherein the recording of the web conference is configured to be accessed by the user based on the association between the recording of the web conference and the user that is created.

16. The computer program product of claim 15, wherein the user analytics generated by tracking and analyzing use, by the user, of web based resources unrelated to the web conference are generated by tracking and analyzing use of a social networking system by the user.

17. The computer program product of claim 15, wherein the user analytics generated by tracking and analyzing use, by the user, of web based resources unrelated to the web conference are generated by tracking and analyzing Internet searches performed by the user.

18. The computer program product of claim 15, wherein the user data further comprises user bookmarking preferences selected or generated by the user.

19. The computer program product of claim 15, the method further comprising:

receiving, by the processor, from the user at least one user input while the multimedia content is presented during the web conference;

responsive to the user input, generating at least a second bookmark providing, upon selection of the second bookmark, access to a second segment of the web conference; and adding the second bookmark to the bookmark artifact associated with the user.

20. The computer program product of claim 19, wherein the at least one user input comprises data entered by the user to be associated with the second bookmark, the method further comprising:

adding, by the processor, the data entered by the user to the bookmark artifact, wherein at least a portion of the data contained in the bookmark artifact is configured to be processed to present the data entered by the user back to the user responsive to the user selecting the second bookmark.

* * * * *